No. 882,240. PATENTED MAR. 17, 1908.
J. B. FENDER.
WATER PURIFYING APPARATUS.
APPLICATION FILED JUNE 4, 1907.
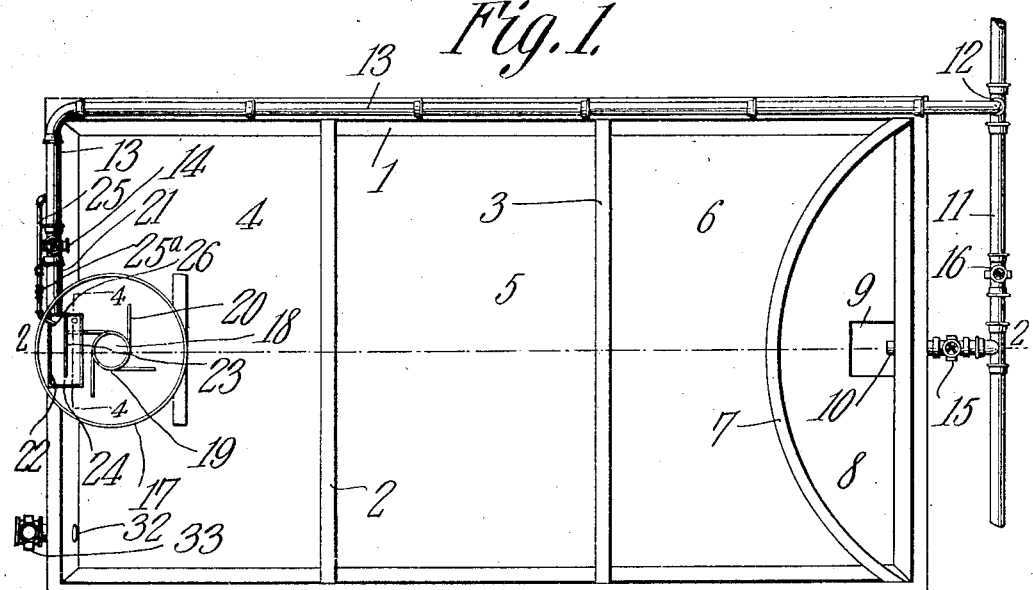
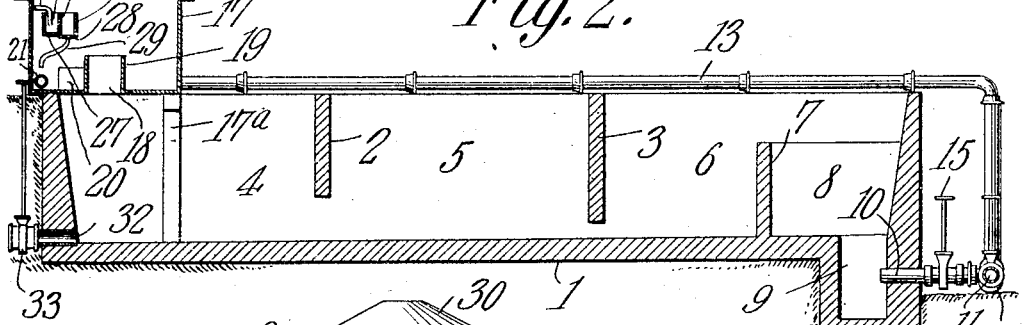
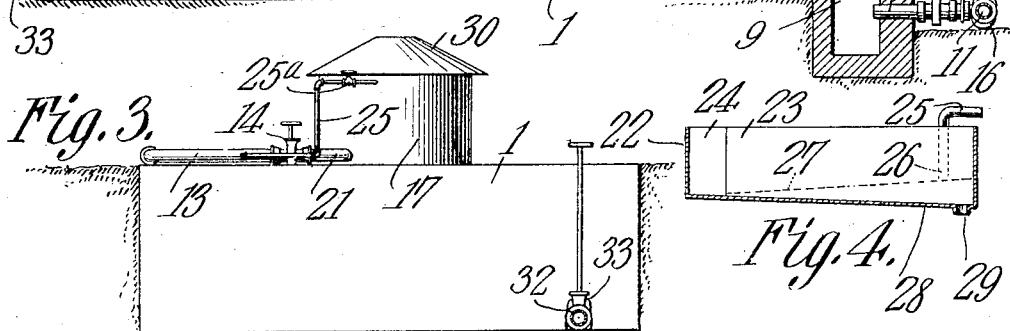
WITNESSES:
John B. Fender, INVENTOR.
By C. A. Snow & Co.
ATTORNEYS

UNITED STATES PATENT OFFICE.

JOHN B. FENDER, OF KAUFMAN, TEXAS.

WATER-PURIFYING APPARATUS.

No. 882,240.

Specification of Letters Patent.

Patented March 17, 1908.

Application filed June 4, 1907. Serial No. 377,170.

*To all whom it may concern:*

Be it known that I, JOHN B. FENDER, a citizen of the United States, residing at Kaufman, in the county of Kaufman and State of Texas, have invented a new and useful Water-Purifying Apparatus, of which the following is a specification.

This invention relates to an apparatus for purifying water by causing all impurities therein to be removed therefrom through the action of gravity assisted by a chemical solution.

The main object of the invention is to purify water and render it potable by impregnating it with a small percentage of an inocuous chemical salt, and then, before turning the water into the distributing mains, to pass it through a settling basin or basins, in which all impurities such as mud, silt and similar substances, including vegetation, will gravitate to the bottom of said basin or basins and the purified water drawn off from the top.

A further object of the invention relates to the means for thoroughly mixing the impure water with the chemical substance before it enters the settling basin.

With these and other objects in view, the invention consists of the novel construction, combination and arrangement of parts hereinafter described and claimed.

In the accompanying drawings: Figure 1 is a plan view of the water purifying apparatus. Fig. 2 is a vertical longitudinal sectional view on the line 2—2 of Fig. 1. Fig. 3 is a view in elevation of the inlet end of the basin. Fig. 4 is a sectional view of the mineral or chemical box taken on the line 4—4 of Fig. 1.
Similar reference numerals are used on the same parts in all the figures.

The settling basin 1, which may be constructed of wood, brick and cement, or concrete, either plain or reinforced, is preferably built below the level of the ground and of such proportions as will be demanded by the quantity of water to be purified. As an example of the size of a practical basin, its proportions may be say, one-hundred feet long, twenty-five feet wide and five feet deep. Across the basin are constructed two straight partitions 2 and 3, dividing it into three approximately equal compartments 4, 5 and 6. The partitions 2 and 3 do not extend to the bottom of the basin, but are raised above it to provide passages for the water from one end of the basin to the other, the partition 3 being nearer the bottom of the basin than the partition 2. Extending in a curved direction from one corner of the basin to the other in the compartment 6 is a wall 7 built up from the bottom of the tank and impervious to the passage of water. The height of the wall 7 is less than the depth of the basin so that before the basin fills with water, it overflows the wall 7 into a receptacle 8 bounded by said wall and the end of the basin. Within the receptacle 8 and depressed below the bottom of the basin is a trap 9 into which the purified water enters and from which it passes out through a pipe 10.

An underground water main 11, outside one end of the basin, is tapped at 12 for a by pass main 13 that leads along the side of the basin to its other end where it turns at a right angle and continues in the direction of the central line of the tank to a gate or other suitable valve 14. The pipe 10 is connected to a gate valve 15 and from thence to the main 11. Another gate valve 16 is placed in the main 11 between the by pass main 13 and the pipe 10. When the valve 16 is closed water must pass through the by pass main 13 and valve 14 therein, into the basin and from thence out through the pipe 10 and valve 15 to the main again. But when it becomes necessary to clean the basin, the valves 14 and 15 are closed and the valve 16 opened, permitting the water to pass straight through the main.

At the end of the basin 1 above the compartment 4 is erected a cylindrical mixing tank 17, supported on the edge of the tank and overhanging the same, and upheld by a frame 17ª, said tank having a central opening 18 in the bottom surrounded by an upstanding flange 19 reaching into the tank for a short distance. Attached to the flange 19, and extending tangentially therefrom are a plurality of plates or wings 20. From the gate valve 14, a pipe 21 enters the tank in a tangential direction at the bottom thereof.

Near the top of the tank 1 above the mouth of the pipe 21 is placed the mineral box 22 for holding the chemical salt in lump form to be dissolved and enter the water flowing from the pipe 21. The preferred salt is aluminium sulfate, but other salts may be used either alone or in combination. The mineral box 22 is preferably rectangular in outline with a longitudinal central partition 23 extending from one end of the box nearly to the opposite end, a passage 24 being left between the end of the partition and the end of the box. From the main 13 a small pipe 25, provided with a valve 25ª, enters the tank 17 and has its end 26 bent downwardly into the box 22 on the outer side of the partition 23. The floor 27 on this side of the box inclines downwardly towards its opposite end where will be found the passage 24, and from whence the floor 28, on the inner side of the partition, continues its downward inclination to the inlet end where it is perforated for an outlet pipe 29 which empties just above and slightly in advance of the mouth of the pipe 21. The tank 17 is protected by a removable cover 30 having a central opening 31.

The floor of the basin 1 falls slightly from all directions toward the drain pipe 32 through which outlet, the water used to clean the tank makes its escape. A valve 33 is applied to said pipe and closed when the basin is in operation.

When water is to be purified, the gate valve 16 in the main 11 is closed, causing the water to enter the by pass main 13. Sulfate of aluminium preferably in lumps is placed in the mineral box 22, and the valves 14 and 25ª opened, admitting water to the tank 17 and to the mineral box. The water in the mineral box, owing to the inclination of the floor, travels the length of the box and then back again before emptying into the outlet pipe 29. During this travel of the water it dissolves some of the salt in the box, impregnating the water which then pours through the outlet pipe 29 into the entering stream of water from the main 13 through the pipe 21. The water entering the tank in a tangential direction is whirled around the tank several times before it can make its exit through the central opening 18 into the basin. The whirling motion of the water from the pipe 21 tends to mix with the chemically treated water coming from the box and is assisted therein by the projecting tangential plates or blades 20 on the flange 19. By this means the impregnated water is thoroughly mixed with the impure water and the two, then passing into the basin 1, move slowly to the opposite end thereof, passing first under the partition 2 and then below the partition 3 into the compartment 6. By this time the chemical substance has acted on all the impurities in the water capable of treatment thereby and descended to the bottom of the basin. When the water reaches the wall 7 it is thoroughly purified, and pouring over said wall it enters the trap 9 and thence by way of pipe 10 to the main from whence it may be pumped into a reservoir, stand pipe or distributed by gravity.

Having thus described the invention what is claimed is:—

1. In a water purifying apparatus, a settling basin, having an outlet for purified water, combined with a circular mixing tank, means for directing water tangentially into the tank, said tank having a central outlet opening leading to said basin, and a box for holding a purifying chemical salt through which a stream of water from the water to be treated passes and which is poured into the water to be purified at its entrance into the mixing tank.

2. In a water purifying apparatus, a settling basin, having a wall at one end over which the purified water pours to an outlet main, combined with a mixing apparatus at the other end consisting of a circular mixing tank having a flanged central delivery, opening over said basin, and tangential plates or blades on said flange, a box in the upper end of said tank longitudinally divided for the greater part of its length in which the purifying chemical is placed, a main leading to and entering said mixing tank at a tangent, a branch pipe from said main to said box and a delivery pipe from said box to the mouth of the main within the mixing tank.

3. In a water purifying apparatus, a settling basin having a plurality of partitions extending transversely across the same, their lower edges raised above the floor of the basin, the space between each partition and the basin decreasing towards the outlet end, a curved wall at the outlet end of the basin and rising therefrom to a height less than the first mentioned partitions and having an outlet leading to the distributing main combined with a mixing tank at the receiving end of the basin into which the water to be treated enters and having an outlet therefrom into the basin, and a box for holding a purifying material through which a stream of water enters and after traveling a tortuous passage therein empties into said tank.

4. In a water purifying apparatus a settling basin having a plurality of cross partitions open below to permit water to pass thereunder, said openings decreasing in height towards the outlet end of the basin, a curved wall at the outlet end of the basin over which the purified water flows, combined with a mixing tank at the receiving end of the basin having deflectors and an opening into the basin below, a box containing a purifying material over the mixing tank and having an outlet leading thereinto, a main for nonpurified water having a by pass main leading to the purifying tank with a valve therein, a valved pipe leading from said by pass main in front of its valve to the chemical box, and a short main connecting the purified water receptacle behind the curved wall to the principal main, a valve in said main and a valve in the principal main between the by pass main, and the purified water main.

5. In a water purifying apparatus, a settling basin, a mixing tank supported over one end of said basin, a central outlet opening in said tank surrounded by an internal flange, tangential wings or plates extending into said tank from the flange, a water inlet pipe entering the side of the pipe at a tangent to produce a vortical movement of the water therein, and a chemical tank feeding small quantities of a solution of water purifying material to the water as it emerges from the inlet pipe and with which it is thoroughly mixed by said wings or plates and the vortical motion of the water.

6. In a water purifying apparatus, a box therefor for holding purifying chemical salts, having a central longitudinal partition extending from one end to near the other end, an inlet pipe on one side and an outlet pipe on the opposite side of said partition and at the same end, and a floor for said box inclining downwardly from said inlet pipe to the outlet pipe.

7. In a water purifying apparatus, a box therefor for holding purifying chemical salts, divided by a central longitudinal partition into two water ways connected at one end of the box, an inlet pipe and an outlet pipe on opposite sides of the partition at the other end of said box, and a divided floor for said box wherein that portion on the inlet side of the partition inclines downwardly to the opposite end, from whence the floor on the opposite side of the partition also inclines downwardly to the outlet pipe.

In testimony that I claim the foregoing as my own, I have hereto affixed my signature in the presence of two witnesses.

JOHN B. FENDER.

Witnesses:
JAMES YOUNG,
JED. C. ADAMS.